July 5, 1960     I. D. SMITH     2,943,498

STEERING MECHANISM

Filed Feb. 25, 1957     3 Sheets-Sheet 1

INVENTOR.
IRA D. SMITH

BY

ATTORNEY

July 5, 1960 I. D. SMITH 2,943,498
STEERING MECHANISM
Filed Feb. 25, 1957 3 Sheets-Sheet 3

INVENTOR.
IRA D. SMITH
BY

ATTORNEY

United States Patent Office 2,943,498
Patented July 5, 1960

2,943,498

STEERING MECHANISM

Ira D. Smith, Bedford, Ohio, assignor to Cleveland Pneumatic Industries, Inc., Cleveland, Ohio, a corporation of Ohio Filed Feb. 25, 1957, Ser. No. 642,146

5 Claims. (Cl. 74—106)

This invention relates generally to aircraft structures and more particularly to a new and improved steering mechanism suitable for use in the ground steering of an aircraft.

In the patent to Walter H. Hogan, No. 2,779,556, a steering mechanism is disclosed which is capable of providing efficient steering through normal steering angles. In this device a piston and cylinder fluid motor is utilized to provide the steering power to rotate the steerable wheels of an aircraft. The preferred structure utilizes a cylinder pivoted on the upper telescoping member of the strut and a piston pivotally connected to a torque collar rotatably mounted on the strut. The pivots of the cylinder and piston are so arranged that they are equally spaced from the central axis of the strut and are co-axial when this steering system is in the neutral position at which time the steerable wheels are in alignment with the major axis of the aircraft. When both the cylinder and piston pivots are co-axial, in the neutral position, the steering motor is unstable and means must be provided to prevent uncontrolled motion of the piston and cylinder around the co-axial pivots. When, however, the steering in positions wherein the piston and cylinder pivots are spaced the system is self-stabilizing. In the device shown in the cited patent, a stabilizing bar is pivotally connected between the cylinder and the torque collar and is so arranged that it maintains the cylinder and piston in the desired position when the cylinder and piston pivots are co-axial. A slot means is also provided to render the stabilizing bar ineffective when the steering system has rotated from the neutral position since the structure is self-stabilizing at this time. Such an arrangement is more than adequate when the steering angles are the size normally required but becomes cumbersome when the device must provide unusually large angles of steering. A structure according to the present invention, however, provides simple and lightweight stabilization in a system having large steering ranges in the order of 180° or more.

It is, therefore, an important object of this invention to provide a new and improved steering mechanism capable of operating through large steering angles.

It is another important object of this invention to provide a light weight combined steering mechanism and stabilizing means which can efficiently steer through a steering range in the order of 180°.

It is still another important object of this invention to provide a new and improved stabilizing structure for a steering motor.

It is still another object of this invention to provide, in combination, a steering motor for aircraft incorporating a piston and cylinder pivotally connected to the steering collar and strut at points equally spaced from the central axis of the strut which pivots are co-axial in one position of operation and a stabilizing device operable to stabilize the steering motor in only said co-axial position.

Further objects and advantages will appear from the following description and drawings, wherein.

Figure 1:
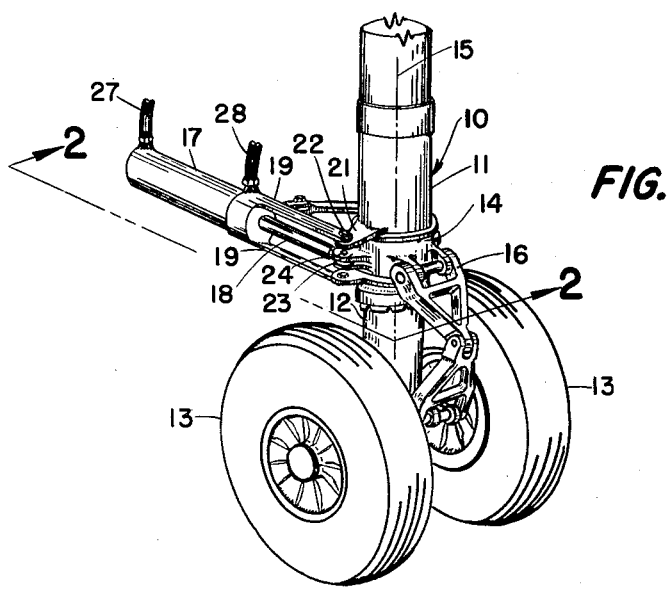
Figure 1 is a fragmentary perspective view of a typical landing gear incorporating a steering mechanism according to this invention.

Referring to the drawing, the steering mechanism is shown as it would be used on a conventional nose strut 10 of a landing gear. The strut itself includes an upper telescoping member 11 adapted to be mounted on the frame of an aircraft and a lower telescoping member 12 on which is journaled ground engaging wheels 13. The lower telescoping member 12 is axially moveable and rotatable relative to the upper telescoping member 11 and these two members are normally provided with a pneumatic spring which resiliently urges the two members apart and thereby resiliently supports the load carried by the landing gear. Journaled on the upper telescoping member 11 is a steering collar 14 which is axially fixed relative to the upper telescoping member 11 and rotatable relative thereto around a central axis 15. Connected between the steering collar 14 and the lower telescoping member 12 are torque arms 16 which prevent relative rotation between these members while permitting relative axial movement. The steering of the wheels 13 is accomplished by rotation of the steering collar 14 which is mounted for rotation on the upper telescoping member 11, the rotation being transmitted to the lower telescoping member 12 through the torque arms 16.

A steering motor, including a cylinder 17 and a piston 18 axially movable relative to each other under the influence of hydraulic fluid under pressure, is used to provide the steering power. The cylinder 17 is provided with axially extending mounting portions 19 which extend along opposite sides of the piston 18 and are pivoted at 22 on mounting lugs 21 formed on the upper telescoping member 11 and above and below the steering collar 14. The piston 18 is also pivotally connected at 24 to lugs 23 formed on the steering collar 14 so that axial motion of the piston 18 relative to the cylinder 17 produces rotation of the steering collar 14 relative to the upper telescoping member 11.

Figure 2:
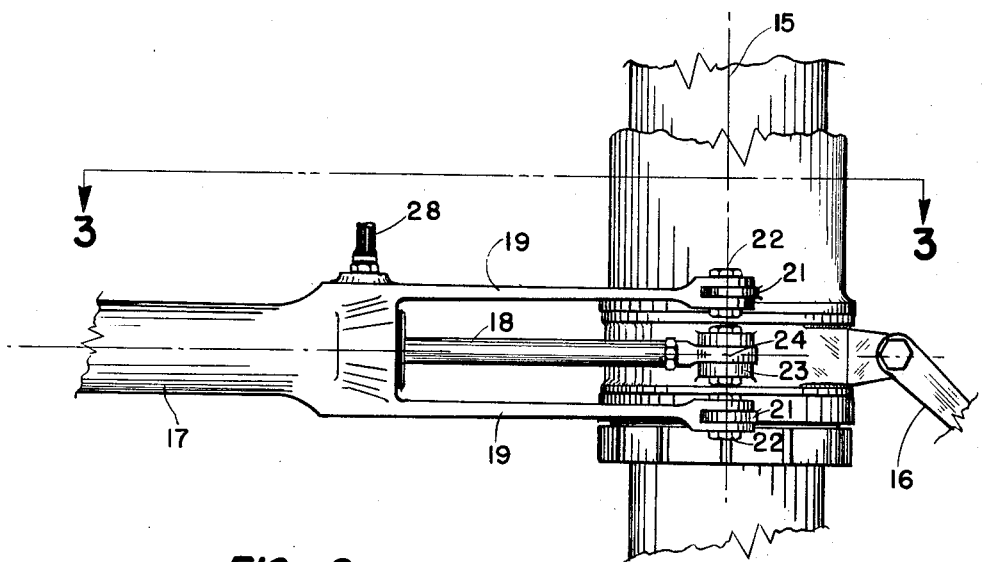
Figure 2 is an enlarged fragmentary side elevation taken along 2—2 of Figure 1 showing the preferred structure for mounting the steering motor on the landing gear.

The cylinder 17 can be connected to any suitable source of fluid under pressure through suitable control valving by means of pressure hoses 27 and 28. When the pressure hose 27 is connected to the source of pressure fluid, the hose 28 is connected to the reservoir return and the piston 18 moves to the right as shown in Figures 1 and 2. Conversely, when the opposite fluid connections are made the piston 18 moves to the left.

The various elements are proportioned so that the axes of the pivots 22 and 24 are co-axial when the steering mechanism is in the neutral position at which time the wheels 13 are in alignment with the major axis of the aircraft. When the steering mechanism is in this position the fluid motor is not self-stabilizing because the pivots are co-axial but when the piston 18 moves in either direction from the neutral position to rotate the steering collar 14 the axis of the pivot 24 moves out of alignment with the axis of the pivot 22 so that the mechanism is self-stabilizing. Because the axes of the pivots 22 and 24 are equally spaced from the central axis 15 the cylinder 17 rotates about its pivot 22 through an angle equal to one half the angle of rotation of the steering collar 14. Therefore, when the steering collar 14 rotates to a position 90° from the neutral position the cylinder 17 rotates around its pivot 22 through 45° in the same direction. This two to one ratio exists throughout the entire range of steering due to the geometry of the system.

Figure 3:
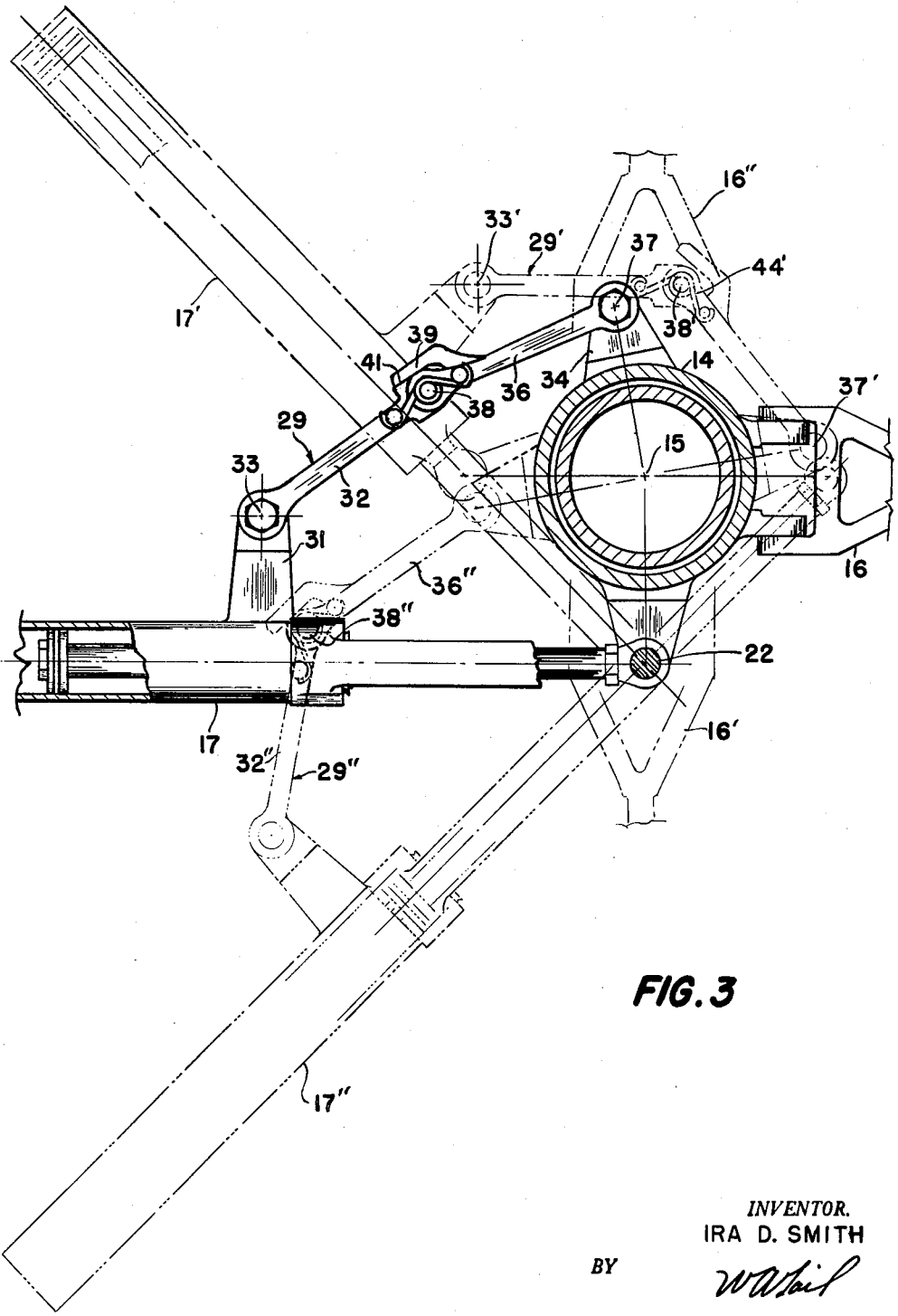
Figure 3 is a plan view taken along 3—3 of Figure 2 showing the steering mechanism in the neutral position and in the extreme position of steering.
Figure 4:
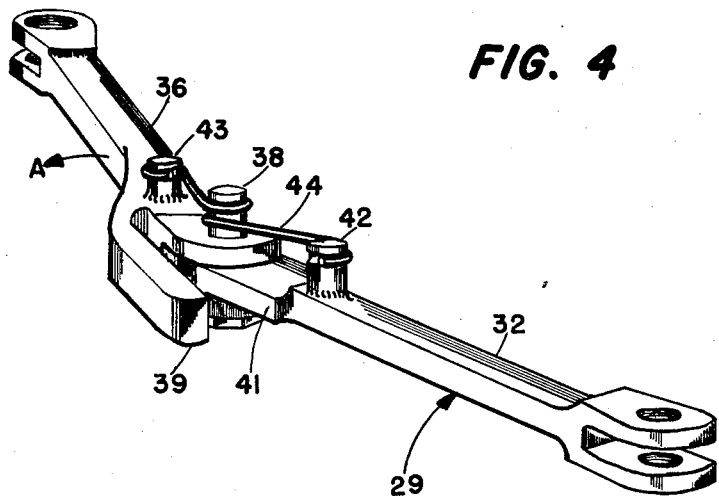
Figure 4 is a perspective view of the preferred stabilizing device according to this invention.

Referring now to Figure 3, a stabilizing linkage 29 is pivotally connected between the cylinder 18 and the steering collar 14. To provide this connection the cylinder 17 is formed with a lateral projection 31 to which a first link 32 of the stabilizing linkage 29 is pivoted as at 33. The steering collar 14 is also formed with a lateral projection 34 on which a second link 36 of the stabilizing linkage 29 is pivoted at 37. The two links 32 and 36 are pivotally connected together by a pivot pin 38 for rotation relative to each other. The second link 36 is formed with a projecting portion 39 which extends beyond the pivot 38 and is adapted to engage a stop surface 41 formed on the first link 32 to limit rotation of the second link 36, around the pivot pin 38, relative to the first link 32 in a counter clockwise direction beyond the position shown in the solid line view of Figure 3. The two links 32 and 36 are also formed with projections 42 and 43 respectively on which the ends of a spring 44 are anchored as best seen in Figure 4. The spring 44 extends from the projection 42 around the end of the pin 38 and is arranged so that it produces a spring force urging the second link 36 counter clockwise relative to the first link 32 as shown by the arrow "A." Therefore, the projecting portion 39 is normally maintained in engagement with the stop surface 41 by the spring 44 and the two links 32 and 36 are resiliently retained in a fixed position relative to each other and normally operate as a unitary link of a fixed length. The proportions are arranged so that the pivot pin 38 is spaced on the side of a line through the pivots 33 and 37 remote from the strut so that forces tending to move the pivots 33 and 37 together operate to oppose the force of the spring 44 and if they are large enough will cause the two links 32 and 36 to fold around the pivot pin 38.

The stabilizing linkage 29, in co-operation with the cylinder 18, the steering collar 14 and the upper telescoping member 11 co-operate and constitute a closed four-bar linkage. The first bar of this linkage, namely the upper telescoping member 11, is stationary and, in effect, extends from the central axis 15 to the pivot 22. The steering collar 14 is journaled for rotation around the central axis 15 so it constitutes a second bar of the four-bar linkage which is rotatable around the central axis 15 and extends to the pivot 37. A third bar of the four-bar linkage is provided by the cylinder 17 and extends from the pivot 22 to the pivot 33 and the fourth bar is provided by the stabilizing linkage 29 and extends between the pivots 33 and 37. This four-bar linkage is provided so long as the stabilizing linkage 29 retains a fixed length. The various proportions of this linkage should be arranged so that the angle of rotation of the steering collar 14 will be substantially twice the angle of rotation of the cylinder 17 through the steering range of the system. It is recognized that it is impossible to provide a four-bar linkage which will give exactly a two to one ratio between these angles of rotation through the entire steering range which exact rotation is required by the mounting of the cylinder 17 and piston 18 on the strut. It is for this reason that the stabilizing linkage 29 is constructed so that it can fold.

In Figure 3 two phantom views are shown which illustrate the relative positions of the various elements when the steering collar 14 is rotated through 90° to the right and the left from the neutral position. A single prime (') will be added to the reference numerals of the various elements when they are in the extreme position of steering to the right and a double prime (") is added to the reference numerals to indicate the position of the elements for full steering position to the left. When the cylinder is moved to the position of 17' namely the position of full steering to the right, the steering collar 14 has rotated from the neutral position through 90° as illustrated by the position of the torque arms 16'. At this time the position of the cylinder 17' is such that it has rotated from the neutral position around the pivot 22 through 45°. As mentioned previously, this is required by the mounting of the piston 18 and cylinder 17 on the strut. If the stabilizing linkage 29 were a solid link this amount of rotation of the cylinder 17 would require rotation of the steering collar 14 through an angle greater than 90° so it is necessary for the stabilizing link 29' to fold around its pivot pin 38' against the action of the spring 44'. The force necessary to produce the folding of the stabilizing linkage 29 originates in the piston and cylinder pivots and in the bearing between the piston and cylinder. A similar situation occurs to the full steering position to the left as indicated by the double prime (") figure. In this case the cylinder portion 17" is spaced from the neutral position an angle equal to 45° and the steering collar 14 is displaced through 90° from the neutral position as indicated by the torque arms 16". Again if the stabilizing linkage 29 were to have a fixed length the angle of rotation of the cylinder 17" would have to be greater than 45° when the steering collar 14 rotates through 90° to the left. Because the mounting of the cylinder and piston prevents such movement the stabilizing linkage 29" is again folded or shortened by relative rotation of the links 32" and 36" around the pivot pin 38".

Figure 5:
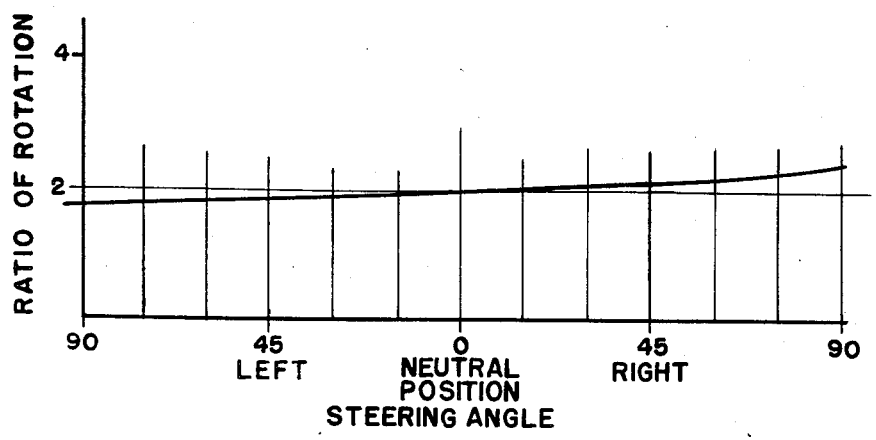
Figure 5 is a ratio of rotation curve of the four-bar linkage incorporating the stabilizing device.

Figure 5 is a plot of the operation of the four-bar linkage which assumes that the stabilizing linkage 29 remains a fixed length wherein the angle of rotation of the steering collar 14 from the neutral position divided by the angle of rotation of the cylinder 17 from its neutral position is plotted as a curve for all the angles of steering. When the steering collar 14 has rotated to the left through 90° the ratio of the angle of rotation of the steering collar divided by the angle of rotation of the cylinder is less than two and when the steering collar is rotated 90° to the right the ratio is greater than two. It should be noted that the ratio has a value of two when the steering mechanism is in the neutral position and very closely approximates the two value through substantial angles to either side of this position. Therefore, the stabilizing linkage 29 will not fold until the steering collar has turned through substantial angles from the neutral position at which time there will be substantial spacing between the pivots 22 and 24 so that excessive forces will not be developed in order to cause the folding of the stabilizing linkage 29. The forces that cause the folding of the stabilizing linkage 29 originate in the pivots 22 and 24 and the bearing between the piston 18 and cylinder 17, and the magnitude of these forces for a given force folding the stabilizing linkage 29 is inversely proportional to the spacing between the axes of the pivots 22 and 24. Since the four-bar linkage very closely approximates the two to one ratio in the central range of steering around the neutral position, the smaller amounts of looseness required in all pivots are sufficient to absorb the difference between four-bar linkage curves and the two to one ratio until substantial angles from the neutral position are reached. At this time excessive forces will not be necessary in the fluid motor to produce folding of the stabilizing linkage 29 against the action of the spring 44.

It should be noted that in the full right position of steering the pivot pin 38' is moved away from the line through the pivots by the pistons 33' and 37' so that the stabilizing linkage 29' tends to move clear of or fold around the strut. This eliminates any problem of interference. It is desirable to arrange the four-bar linkage so that the stabilizing linkage 29 will shorten in both extreme positions of steering so that the structure of the type shown may be utilized wherein the linkage is resiliently urged against a positive stop. The spring 44 is sized so that there is sufficient rigidity to prevent any vibration or impact shocks from causing the cylinder 17 to rotate around the axes of the pivot 22 when the mechanism is in the neutral position. Therefore, the stabilizing linkage provides stabilization when it is needed but can fold or become ineffective as the system rotates toward the extreme positions of steering wherein it is not needed. Those skilled in the art will recognize that this simple mechanism can be made extremely light and still provide sufficient strength to withstand rough aircraft service.

Although the preferred embodiment of this invention is illustrated, it will be realized that various modifications of the structural details may be made without departing from the mode of operation and the essence of the invention. Therefore, except insofar as they are claimed and appended claims, structural details may be varied widely without modifying the mode of operation. Accordingly, the appended claims and not the aforesaid detailed description is determinative of the scope of the invention.

I claim:

1. An aircraft steering mechanism comprising a fixed element, a rotatable element mounted on said fixed element for rotation about a first axis in either direction from a first position, fluid activated co-operating cylinder and piston members capable of relative axial displacement, pivot means mounting one of said members on said fixed element for rotation relative thereto around a second axis and the other of said members on said rotatable element for rotation relative thereto around a third axis, said second and third axes being co-axial when said rotatable element is in said first position, and stabilizing means including a pair of links pivoted together for rotation relative to each other with one link pivoted on one said member and the other pivoted on said rotatable element, and means operatively connected to said links resiliently retaining said links in a fixed position relative to each other thereby preventing uncontrolled movement of said members relative to said elements when said second and third axes are co-axial.

2. An aircraft steering mechanism comprising a fixed element, a rotatable element mounted on said fixed element for rotation about a first axis in either direction from a first position, fluid activated co-operating cylinder and piston members capable of relative axial displacement, pivot means mounting one of said members on said fixed element for rotation relative thereto around a second axis and the other of said members on said rotatable element for rotation relative thereto around a third axis, said second and third axes being co-axial when said rotatable element is in said first position, and stabilizing means including a pair of links pivoted together for rotation relative to each other with one link pivoted on one said member and the other pivoted on said rotatable element, stop means on said links limiting rotation of one of the links relative to the other beyond a predetermined position, and means operatively connected to said links resiliently retaining said links in said predetermined position when said second and third axes are co-axial.

3. An aircraft steering mechanism comprising a fixed element, a rotatable element mounted on said fixed element for rotation about a first axis in either direction from a first position, fluid activated co-operating cylinder and piston members capable of relative axial displacement, pivot means mounting one of said members on said fixed element for rotation relative thereto around a second axis and the other of said members on said rotatable element for rotation relative thereto around a third axis, said second and third axes being co-axial when said rotatable element is in said first position, and stabilizing means including a pair of links pivoted together for rotation relative to each other with one link pivoted on said one member at a first point and the other pivoted on said rotatable element at a second point, and means operatively connected to said links resiliently retaining said links in a fixed position relative to each other thereby preventing over uncontrolled movement of said members relative to said elements when said second and third axes are co-axial, the axis of the pivot connecting said links being spaced on the side of a line through said first and second points remote from said first axis.

4. An aircraft steering mechanism comprising first and second elements connected for relative rotation around a first axis, co-operating piston and cylinder members axially movable relative to each other, pivot means connecting one of said members and first element for relative rotation around a second axis and the other of said members to said second element for relative rotation around a third axis, said second and third axes being co-axial in one position of steering and movable relative to each other to positions wherein they are spaced from each other upon said axial movement of said members, a first link connected to a said first element, a second link connected to said one member, a connection between said links permitting relative movement therebetween from a predetermined position, and resilient means operatively connected to said links normally maintaining them in said predetermined position.

5. An aircraft steering mechanism comprising first and second elements connected for relative rotation around a first axis, co-operating piston and cylinder members axially movable relative to each other, pivot means connecting one of said members and first element for relative rotation around a second axis and the other of said members to said second element for relative rotation around a third axis, said second and third axes being co-axial in one position of steering and movable relative to each other to positions wherein they are spaced from each other upon said axial movement of said members, a first link pivotally connected to said first element, a second link pivotally connected to said one member, a connection between said links permitting relative movement therebetween from a predetermined position only in a direction tending to move the connections of said links on said elements toward each other, and resilient means operatively connected to said links normally maintaining them in said predetermined position.

References Cited in the file of this patent

UNITED STATES PATENTS 2,779,556   Hogan _____ Jan. 29, 1957